United States Patent [19]

Noble

[11] Patent Number: 4,949,459
[45] Date of Patent: Aug. 21, 1990

[54] STRAWBERRY STEM REMOVAL DEVICE

[76] Inventor: Bradley T. Noble, 110 S. Helberta Ave., Redondo Beach, Calif. 90277

[21] Appl. No.: 371,821
[22] Filed: Jun. 26, 1989
[51] Int. Cl.⁵ .............................................. A47J 23/00
[52] U.S. Cl. .................................... 30/113.1; 426/484
[58] Field of Search .......................... 30/113.1–113.3, 30/130, 316; 426/484, 485

[56] References Cited

U.S. PATENT DOCUMENTS 1,120,914  12/1914  Dodson ............................. 30/316 X
1,448,652  3/1923  Anderson et al. ................. 30/113.1

Primary Examiner—Douglas D. Watts

[57] ABSTRACT

A device used to remove the stem and core from a strawberry is described. This device is useful for quickly and nearly removing strawberry stems and cores in one step. It includes one or more tubular members that are attached to a handle member used to grasp the device. The tubular member is directed through the center of the strawberry until the stem and core are detached from the strawberry. The stem removal device quickly and neatly removes the stem and core from strawberries, while minimizing the wasting of strawberry flesh.

10 Claims, 2 Drawing Sheets

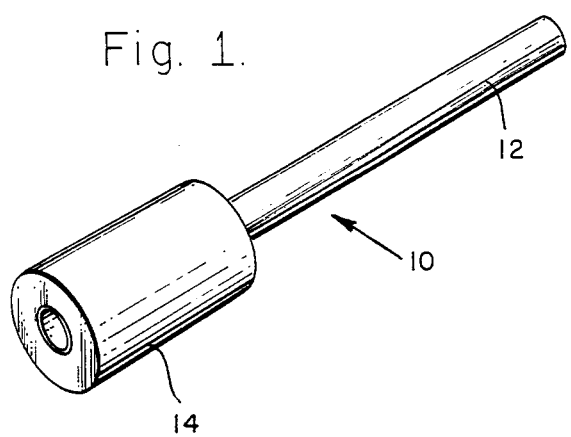
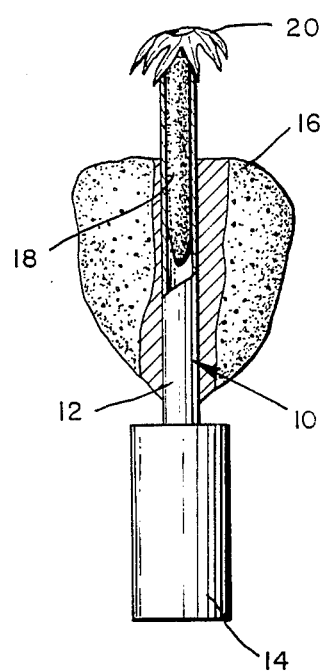
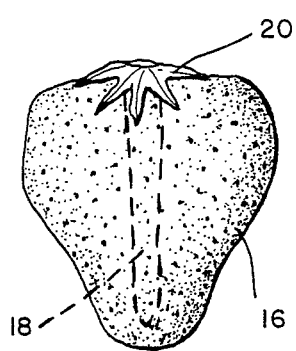
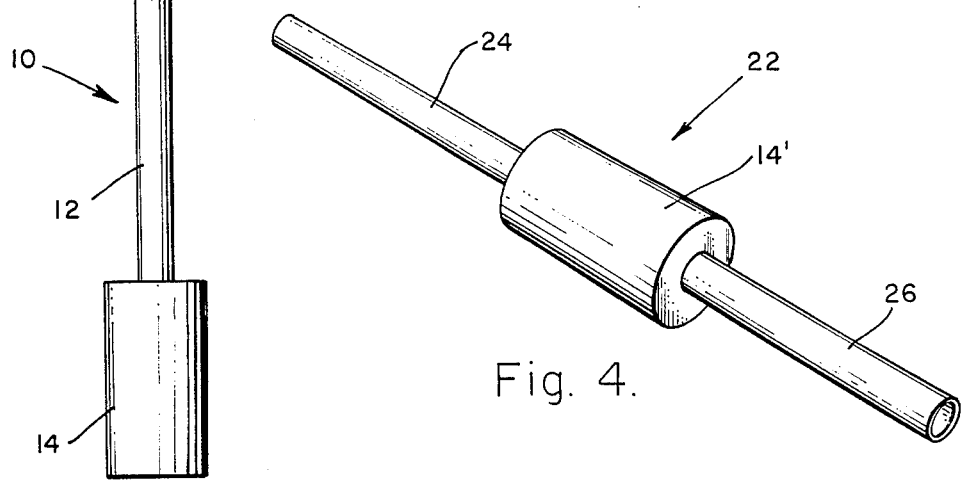
Fig. 1.
Fig. 3.
Fig. 2.
Fig. 4.

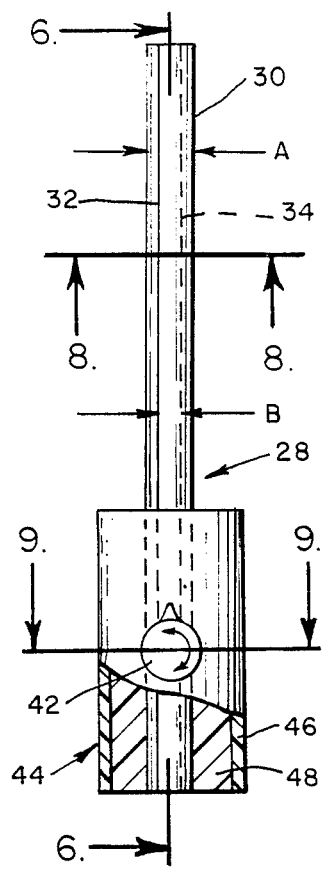
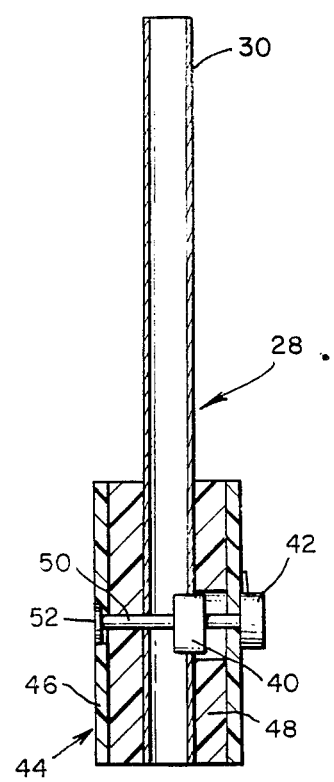
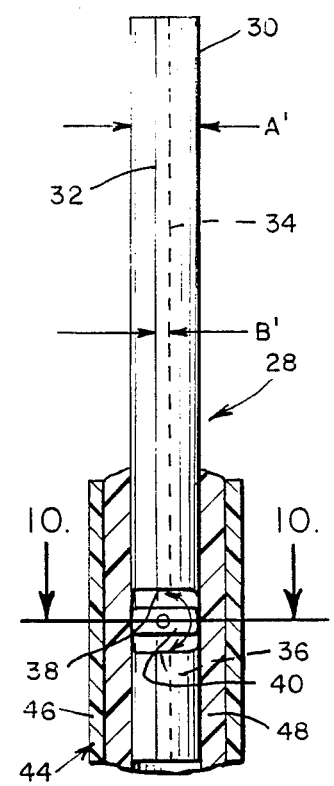
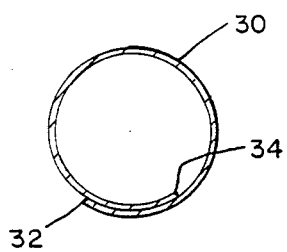
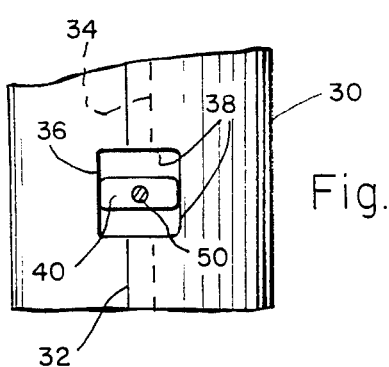
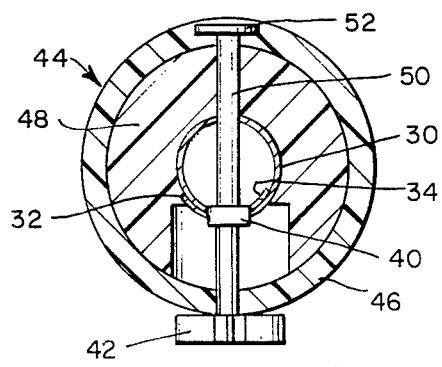
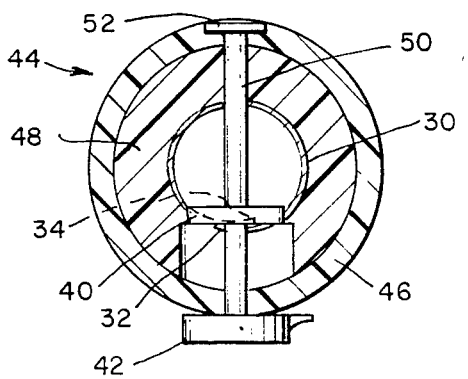

STRAWBERRY STEM REMOVAL DEVICE

FIELD OF THE INVENTION

This invention relates to a device that removes the stem and core from a strawberry.

BACKGROUND OF THE INVENTION

It is desirable to remove the stem and core from strawberries before serving them. This makes the whole strawberry edible and improves its' appearance.

Strawberry stems are commonly plucked off the strawberry with ones' fingers or using a stem plucker. A stem plucker is a tiny pair of tongs that grabs the stem securely allowing it to be pulled off. The core, however, is left intact and the strawberry is left in a partially trimmed state. A paring knife is also commonly employed to remove the stem and core from a strawberry. This method works well, but is time consuming and can waste strawberry flesh.

There has not heretofore been provided a strawberry stem removal device that has the advantages inherent in the system of the present invention.

SUMMARY OF THE INVENTION

The present invention is directed to a device that is inserted through the center of a strawberry until the stem and core become detached from the berry.

The present invention is directed to a device that removes the stem and core from a strawberry with one step. A strawberry is held stem up between the thumb and forefinger of one hand. The stem removal device is held in the other hand and is positioned at the bottom of the strawberry. It is then inserted through the center of the berry until the stem becomes detached from the top. The stem and core can then be removed from the tip of the device. Strawberry stems can be quickly removed using this method, producing clean attractive berries.

The strawberry stem removal system of this invention is particularly desirable for two reasons. It easily removes the stem and core from strawberries leaving them with an appetizing appearance. It also quickly removes the core from the berry and does not waste strawberry flesh. The strawberry stem removal device may also have a tubular member that is adjustable in diameter to accommodate strawberries of different sizes. The strawberry stem removal system of the invention comprises:

a. A strawberry stem removal device having one or more long tubular members that are individually inserted through the centers of strawberries.

b. A handle member attached to one end of the tubular member(s) that is used to grasp the device during use.

c. A knob and cam assembly used to vary the diameter of the tubular member.

It is therefore a primary object of the present invention to provide a device for removing the stem and core from a strawberry.

Another object of the present invention is to provide one or more tubular members that are individually inserted through cores of strawberries.

Still another object of the present invention is to provide a tubular member that is adjustable in diameter to accommodate strawberries of different sizes.

A further object of the present invention is to provide a method for removing the stem and core from a strawberry.

These and other objects of the present invention will become apparent to those skilled in the art as the description thereof proceeds.

BRIEF DESCRIPTION OF THE DRAWINGS

FIG. 1 is a perspective view of the strawberry stem removal device;

FIG. 2 is an elevational view of the device positioned underneath a strawberry;

FIG. 3 is an elevational view in partial cross section of the device in use;

FIG. 4 is a perspective view of a variant of the strawberry stem removal device;

FIG. 5 is a front elevational view of a further variant of the strawberry stem removal device in partial cross section;

FIG. 6 is a partial cross sectional view taken along lines 6—6, as shown in FIG. 5;

FIG. 7 is a partial cross sectional view of the variant shown in FIG. 5 in the expanded position;

FIG. 8 is a cross sectional view taken along lines 8—8, as shown in FIG. 5;

FIG. 9 is a partial cross sectional view taken along lines 9—9, as shown in FIG. 5;

FIG. 10 is a partial cross sectional view taken along lines 10—10, as shown in FIG. 7; and FIG. 11 is a fragmentary view of the notch arrangement shown in FIG. 7.

DESCRIPTION OF THE PREFERRED EMBODIMENT

Referring to FIG. 1, there is illustrated a strawberry stem removal device 10 for removing the stem and core from strawberries. The device 10 has a long tubular member 12 and a handle 14. The tubular member 12 may be manufactured from plastic or a non corrosive metal such as aluminum and is typically in the range of approximately 4-8 millimeters in diameter. The cross sectional shape of the tubular member may vary so long as the tubular member may be inserted through the center of a strawberry. The handle 14 may be manufactured from wood, plastic, rubber or any combination of these materials.

Attention is directed to FIG. 2 showing the device 10 positioned under a strawberry 16. The tubular member 12 is directed up through the center of the strawberry 16 until it emerges out the top of the berry and removes the stem 20 and core 18.

In FIG. 3 the device 10 is shown inserted completely through the center of a strawberry 16. The stem 20 and core 18 are shown detached from the strawberry 16.

In operation after the stem 20 is detached from the strawberry 16, the stem 20 is grasped and removed from the device 10. The strawberry 16 is then removed from the device 10 and is rinsed in water. The strawberry 16 has now been quickly and neatly manicured.

FIG. 4 shows a first variant 22 of the device 10. The variant includes two tubular members 24 and 26 attached to handle 14', in the manner illustrated in FIG. 1. The tubular member 24 has a smaller diameter than the other tubular member 26. The small diameter end is used for small strawberries having small stems and the large diameter end is used for large strawberries having large stems. This provides a means for coring and stemming small and large strawberries using the same device.

In FIG. 5 a second variant 28 is illustrated of the device 10. The variant includes a tubular member 30 that is adjustable in diameter. Distance A denotes the diameter of the tubular member 30 in the contracted position. The tubular member 30 has been cut longitudinally to form two overlapping edges 32 and 34. Edge 32 and 34 overlap a distance B in the contracted position. The handle 44 includes a flexible inner core 48 surrounded by rigid outer wall 46. Also shown is an adjustment knob 42.

In FIG. 6 the variant 28 is shown with knob 42 attached to cam 40 by a shaft 50. The cam 40 can be moved by turning knob 42. The shaft 50 is held in position by a stop member 52. The handle 44 includes a flexible center 48 surrounded by a rigid outer wall 46.

Referring to FIG. 7 the variant 28 is shown in the expanded position. Overlapping edges 32 and 34 are shown which include notches 38 and 36 respectively. The cam 40 is shown in the horizontal position. The flexible center 48 of the handle 44 is shown in the expanded position. The outer wall 46 of the handle 44 remains rigid.

In operation, the diameter of the tubular member 30 may be varied according to the sizes of the strawberries to be cored. When turned, the knob 42 moves the cam 40 which pushes against notches 36 and 38. This in turn expands diameter A' of the tubular member 30. The distance B' between the overlapping edges 32 and 34 has likewise decreased.

Attention is directed to FIG. 8 where edges 32 and 34 of tubular member 30 are shown. Edges 32 and 34 overlap forming a closed cylinder.

In FIG. 9 the handle 44 is shown with tubular member 30 in the contracted position. Edges 32 and 34 are widely overlapped. Knob 42 and cam 40 are shown in the vertical position. Stop member 52 holds shaft 50 in place. The flexible center 48 of the handle 44 is shown in the contracted position. The rigid outer wall 46 of the handle 44 is shown which supports shaft 50.

Referring to FIG. 10, there is shown the handle 44 with tubular member 30 in the expanded position. Edges 32 and 34 are only slightly overlapped. Knob 42 and cam 40 are shown in the horizontal position. Shaft 50 is held in place by stop member 52. The flexible center 48 of the handle 44 is shown in the expanded position. The outer wall 46 of the handle 44 remains rigid and supports shaft 50 which allows it to rotate freely.

In FIG. 11 there is illustrated the notch arrangement shown in FIG. 7. Tubular member 30 is shown in the expanded position. Shaft 50 is attached to and supports cam 40. Cam 40 is shown in the horizontal position which pushes notch 36 and 38 outward. This increases the the diameter of tubular member 30. Edges 32 and 34 overlap slightly, maintaining a closed cylinder.

Other variations are also possible without departing from the scope of the present invention. For example, there may be many overlapping edges formed by many tubular member longitudinal sections. Of course this variation would not provide any functional advantage over the present invention.

While the principles of the invention have now been made clear in illustrative embodiment, there will be immediately obvious to those skilled in the art many modifications of structure, arrangement, proportions, elements, materials, and components used in the practice of the invention which are particularly adapted for specific environments and operating requirements without departing from those principles.

I claim:

1. A strawberry stem removal device particularly configured for removing the stem and core from strawberries, said strawberry stem removal device comprising in combination:
    a. one or more long, tubular members that are individually inserted through the centers of strawberries; and
    b. a handle member attached to one end of the tubular member that is used to grasp the device during use; and
    c. a knob and cam assembly used to vary the diameter of the tubular member.

2. The strawberry stem removal device as set forth in claim 1 wherein the strawberry has a pointed end wherein the orifice of the tubular member is engaged with the pointed end of the strawberry.

3. The strawberry stem removal device as set forth in claim 1 wherein the strawberry has a stem wherein the tubular member is inserted through the strawberry center until the stem and core are detached from the strawberry.

4. The strawberry stem removal device as set forth in claim 1 wherein said tubular member has a longitudinal cut forming overlapping edges.

5. The strawberry stem removal device as set forth in claim 4 wherein each overlapping edge includes at least one notch.

6. The strawberry stem removal device as set forth in claim 1 wherein said tubular member is expandable in diameter.

7. The strawberry stem removal device as set forth in claim 1 wherein said knob and cam assembly are turned causing the tubular member diameter to increase.

8. A method particularly designed for separating the stem and core for the soft flesh of strawberries, said method comprising the steps of:
    a. grasping the strawberry stem up with one hand; and
    b. engaging the pointed end of the strawberry with the tubular member orifice of the strawberry stem removal device; and
    c. inserting the tubular member directly up through the center of the strawberry without a twisting motion; and
    d. detaching the stem and core from the strawberry by pressure provided by the contact of the tubular member orifice with the underside of the strawberry stem; and
    e. pulling the stem and core out of the tubular member orifice and discarding it; and
    f. removing the strawberry from the strawberry stem removal device.

9. The method as set forth in claim 8 wherein the step of engaging includes inserting the tubular member orifice into the pointed end of a strawberry.

10. The method as set forth in claim 8 wherein the step of detaching the stem and core includes inserting the tubular member up through the strawberry center until pressure provided by the contact of the tubular member orifice separates the stem from the strawberry top.

* * * * *